United States Patent Office 3,484,580
Patented Dec. 16, 1969

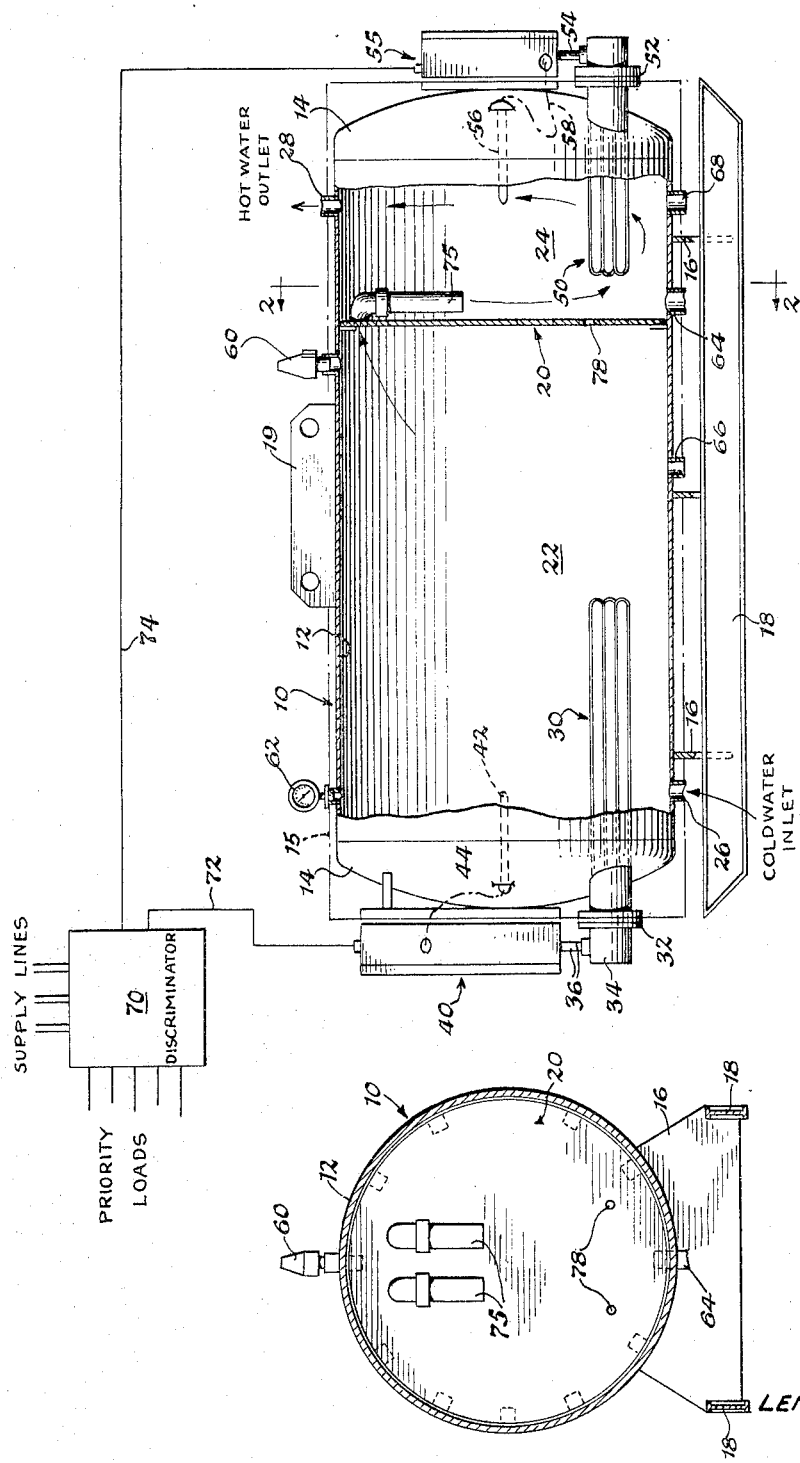

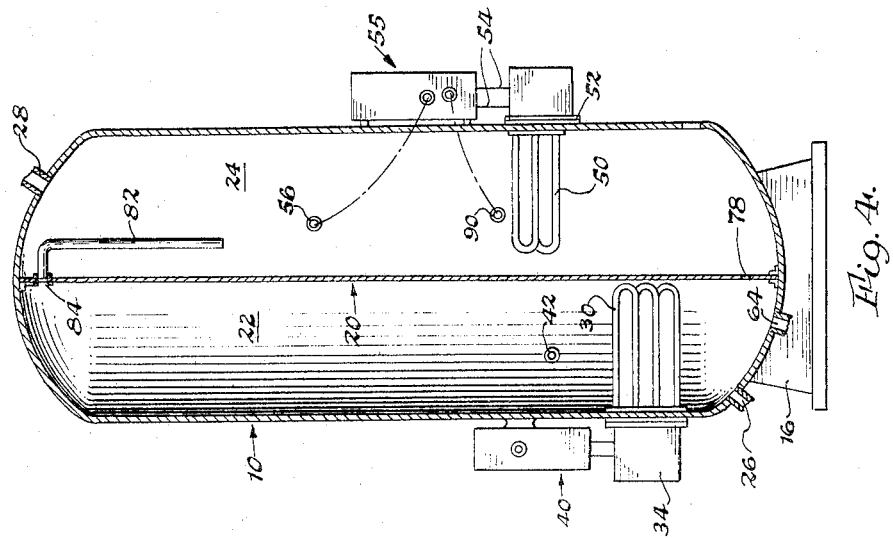
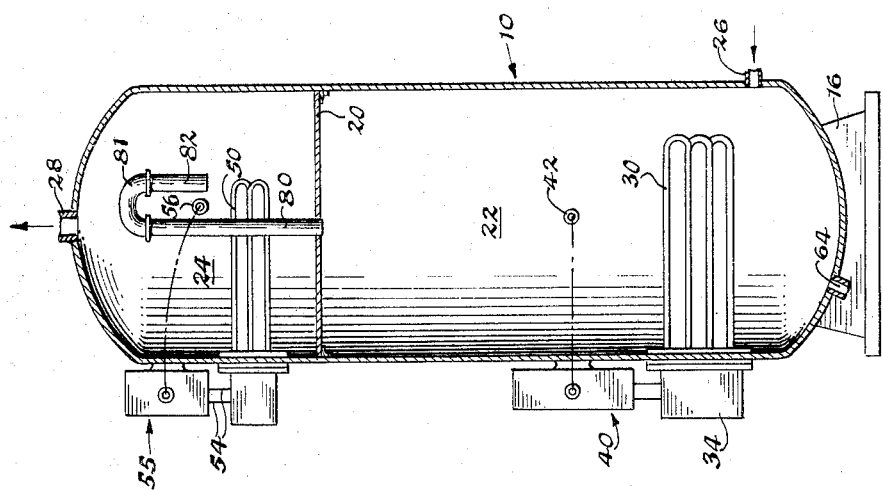

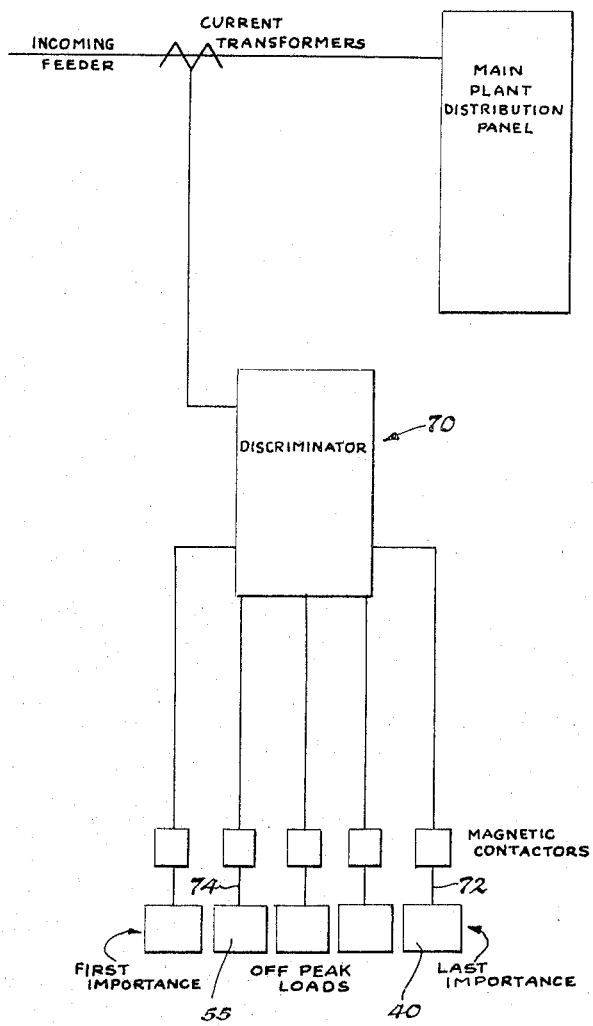

3,484,580
WATER HEATING SYSTEM
Lemuel J. Morgan, Stroudsburg, Pa., assignor to The Patterson-Kelley Co., Inc., East Stroudsburg, Pa.
Filed Aug. 25, 1967, Ser. No. 663,290
Int. Cl. F24h 1/20
U.S. Cl. 219—314          8 Claims

ABSTRACT OF THE DISCLOSURE

An improved arrangement to functionally divide a water heating tank into a relatively high temperature water storage compartment and a relatively low temperature water delivery compartment. The tank is divided by a relatively inexpensive, non-pressurized, thin metal partition casually fitted into the tank. Destructive pressures on the partition during tank filling and emptying are prevented by providing the partition with apertures connecting the compartments in free flow communication. A water transfer trap device is provided to deliver water from a relatively upper level portion of the storage compartment to a relatively lower portion of the delivery compartment in response to delivery of water from the latter to the service outlets. The trap prevents both thermocycling of water between compartments and the delivery of slugs of very hot water directly from the storage compartment to the service outlets.

SUMMARY OF THE INVENTION

The present invention relates to an improved arrangement to functionally divide a tank into a relatively high temperature water storage compartment and a relatively low temperature water delivery compartment; the tank being employed in a water heating system including a total-demand-monitored load discriminating device serving to control heating of water within the respective compartments on a priority basis.

In accordance with the present invention, the tank is divided by a relatively inexpensive and easy to install thin metal partition, which is only casually fitted into the tank. Destructive water pressure loadings on the partition, during filling and emptying of the compartments, as well as during periods of draw off from the delivery compartment, are prevented by providing the partition with apertures serving to connect the compartments in free flow communication.

A particular feature of the present invention is the provision of a water transfer trap device, which is arranged to deliver water from a relatively upper level portion of the storage compartment into a relatively lower level portion of the delivery compartment in response to the delivery of water from the latter to service outlets. The trap device prevents the passing of slugs of very hot water directly from the upper level portion of the storage compartment to the service outlets through a delivery conduit connected into a relatively upper level portion of the delivery compartment. Also, by interconnecting different water temperature stratification levels in the compartments, the trap device prevents thermocycling of water within the tank, which might otherwise occur due to the presence of the partition apertures.

DETAILED DESCRIPTION OF THE INVENTION

The invention is shown by way of example in the specification and the accompanying drawing wherein:

FIG. 1 is a vertical sectional view of a single horizontal tank type water heating system embodying features of the present invention;

FIG. 2 is a sectional view taken as suggested by line 2—2 of FIG. 1;

FIG. 3 is a vertical sectional view through a single vertical tank type water heating apparatus of the invention;

FIG. 4 is a view corresponding to FIG. 3 but illustrating a modified form of water compartment partitioning and intercommunicating arrangement; and FIG. 5 is a schematic illustration of a typical load stabilizing control system such as may be employed in conjunction with the present invention.

As shown in FIGS. 1 and 2, the invention may be embodied in a single horizontal tank type combination water heating and storage system employing a horizontally disposed cylindrical tank designated generally at 10 and comprising a cylindrical wall or shell portion 12 and end closure plates or heads 14—14. The tank may be enclosed within a heat insulated casing 15, and conveniently supported by leg plates 16—16 on skid runners 18—18 for facilitating its transfer from place to place. A lifting lug as indicated at 19 may be welded or otherwise affixed to the upper section of the tank shell to accommodate hook devices of hoists or cranes or the like, such as may be employed from time to time to lift and/or transport the unit.

It is a particular feature of the present invention that a novel partition device such as is illustrated at 20 in FIGS. 1 and 2 be disposed interiorly of the tank 10 so as to divide the tank into two compartments as are designated at 22, 24, respectively; the main or storage tank compartment 22 having perhaps four times the volumetric capacity of the secondary or hot water supply compartment 24. The cold water inlet for the system has shown at 26 communicates with the interior of the storage compartment 22 at a position remote from the partition 20. The hot water drawoff outlet for the system is indicated at 28 and is in communication with the interior of the hot water supply compartment 24 of the tank at the upper level thereof.

An electric immersion heating element assembly as indicated at 30 is mounted as by means of a flange arrangement 32 to extend into the main heating compartment 22 as shown in FIG. 1; the terminals of the heating elements being enclosed within a protective bonnet 34 and connected by power lines 36 to a thermostat controlled automatic power supply switch unit such as is indicated generally at 40. As indicated at 42, a temperature sensing bulb is mounted to extend through the tank shell into the approximate center of the main tank portion 22, and is operatively connected as indicated at 44 to the control unit 40.

The hot water supply tank portion 24 is provided with an electrical element type heating unit as indicated generally at 50; the unit 50 being similarly mounted on the tank shell as indicated at 52 and operatively connected by a conductor 54 to a second power supply control unit which is designated generally at 55. A temperature sensing bulb as indicated at 56 is mounted to extend through the tank shell and into the approximate center portion of the smaller tank section 24, and is operatively connected to the control unit 55 as indicated at 58. Conventionally employed accouterments are also illustrated as being employed, such as a safety valve 60; a pressure gauge 62; a hot water return connection 64; and a sediment blowdown outlet for each tank compartment as indicated respectively at 66, 68.

An integral part of the system of the invention comprises any suitable automatically operating, discriminating power supply control apparatus, such as indicated only by way of example at 70; the power lines to the heaters described hereinabove being separate from one another and separate from other lines going to other loads through the consumer's common meter. As illustrated at FIG. 5, the various load lines are given different priorities by suitable settings of the control apparatus whereby to automatically disconnect the less preferred loads in reverse order to their priorities, so as to avoid total power consumption peaks above a predetermined maximum. Electric power supply utilities usually formulate their rate structures on the basis of maximum demand or peak loads through the customer's meter, including penalty clauses whereby the consumer's rate is increased if and whenever his power consumption exceeds certain values.

Therefore, a consumer installation involving a variety of relatively preferred and less preferred loads (such as lighting circuits, elevators, power lines, space heaters, water heaters, swim pool heaters, sidewalk snow melters, etc.) beneficially employs a meter-controlled priority switching system for automatically dropping the less preferred loads whenever necessary to avoid an undesired peak electrical load condition. Many such automatic load control devices have been developed and are available for this purpose, such as are disclosed for example in U.S. Patents 2,784,322; 2,843,759; 2,904,703. In any case, the purpose of the control device 70 is to automatically select pre-set choices of load, insuring that at no time the chosen peak is exceeded. Thus, when the total demand exceeds the pre-set value, the discriminator 70 automatically disconnects "off-peak" loads in a sequential manner, beginning with the least important load and so on. Conversely, when the total plant demand is below the pre-set value, the discriminator will sequentially connect the power supply lines of the "off-peak" loads, beginning with those of relatively higher priorities. In the present system the power line 72 to the control panel 40 for the heater 30 is given a lower priority than the power line 74 to the control panel 55 for the heater 50, as will be more fully explained hereinafter.

It is a particular feature of the invention that the baffle member 20 is not a pressure bulkhead type partition, but comprises a relatively inexpensive disc of thin sheet metal or the like which is only "casually" fitted to the inner surface of the tank wall member 12. It is intended that the baffle is not to be subjected to any appreciable pressure-differential loadings incidental to draw-offs through the outlet 28, but to act solely as a baffle to preclude any substantial thermocycling of hot water from the outlet compartment 24 into the storage compartment 22. In order to protect the partition 20 from any pressure-differential stresses it may be apertured for example as indicated at 78, thereby permitting pressure exchange flow of liquid from one compartment to the other but only between the lower levels thereof.

The major transportation flow control device of the apparatus comprises a downspout or trap arrangement consisting of one or more conduits such as shown for example in FIG. 2 at 75—75. The downspouts 75 extend from apertures through the upper section of the partition 20 downwardly inside of the compartment 24 to a level therein substantially below the level of water intake from the compartment 22. For example, assuming that the thermostat control for the storage compartment 22 is set at 160 degrees, and the thermostat control for the compartment 24 is set at 150 degrees, the downspout arrangement will be dimensioned as shown in the drawing herewith to intercommunicate substantially different water stratification levels within the two compartments. This prevents convection thermocycling of higher temperature water from the upper part of tank section 24 into the storage tank section 22 during standby periods, while freely permitting at any time (responsive to draw-offs through outlet 28) compensating flow of the hottest water in the storage compartment 22 into compartment 24 and thence out through the outlet 28.

The downspouts 75 function as oneway valves or traps, preventing backflow of higher priority heated water from the tank section 24 into the larger tank section 22 during standby conditions, while insuring delivery of water from the storage section only into the lower portion of the tank section 24 and in the region of its control sensor 56 whenever a draw-off occurs through the outlet 28. By virtue of this arrangement demands by the sensor 56 for energization of the heater unit 50 are deferred as long as sufficiently hot water is available from the storage tank section through the downspout 75 in accordance with the temperature setting of the sensor system 56. Thus, power supply demands for the heating unit 50 are minimized, and the consumer's overall load factor is improved, as will now be explained in further detail.

The power line to the heater 50 is assigned at the discrimination control center 70 a higher priority than the power line to the heater 30, to make certain that the water being delivered through outlet 28 will be at the desired temperature regardless of the temperature of the water in the storage compartment. To this end, the heater in the tank section 24 will be furnished to provide a relatively high kw. rating per gallon of capacity of the tank section, compared to the kw. rating of the heater 30 to the volumetric capacity of the storage tank section. Therefore, as long as the water passing from the storage tank for delivery through the outlet is for example above 150 degrees, the sensor 56 will not call for opeartion of the heater 50; and whenever the water in the storage tank drops below the setting of the sensor 42 the control apparatus 40 will energize the heater 30, provided however that power is available through the main priority control apparatus 70.

Any sudden and heavy demand for hot water resulting in lowering of the water temperature in both tank sections for example below 150 degrees, will automatically call for power supply to the heater 50 in the small tank section at a higher priority compared to the heater 30; whereby water at the desired temperature will always be delivered. Temperature recovery in the larger storage tank section will thereupon await opportunity for a power assignment to the heater 30, such as when other higher priority load demands on the overall system drop off. FIG. 5 illustrates schematically a typically suitable load discrimination or "peak control" system such as may be embodied in the control apparatus illustrated at 70 herein.

FIG. 3 illustrates a modified form of tank and baffle and circulation control trap arrangement adaptable to the purposes of the present invention. In this case the tank 10 is of the vertically standing type with the storage chamber 22 disposed below the outlet supply compartment 24. The compartment dividing baffle 20 comprises a horizontally disposed sheet having a circulation control trap device comprising a vertical stand pipe 80 extending vertically from a centrally disposed aperture through the baffle plate 20 into communication with a reverse-bent fitting 81 leading into a downspout 82. Thus, the baffle 20 prevents any recycling under standby conditions of water from the upper section into the lower section, while the trap device freely permits flow of high temperature water from the storage section 22 into the lower level of the outlet compartment 24 to compensate for draw-offs through the outlet 28. Thus, the trap device 80–82 will function as explained hereinabove in connection with the arrangement shown at FIGS. 1, 2, to cause a deferral of power demands on the "high priority" heater 50, as much as possible.

FIG. 4 corresponds to FIG. 3 but shows still another form of baffle arrangement such as may be employed in a vertically standing tank system. In this case the trap conduit extends from an aperture 84 through the uppermost portion of the tank baffle 20 and downwardly therefrom inside the hot water delivery compartment 24 and into the region of the temperature sensor 56, thereby providing the improved system control and operation as explained hereinabove. Also, as shown in FIG. 4, a third temperature sensor 90 may be disposed in the compartment 24 at a substantially lower elevation in the tank, and more remote from the region of delivery of water by said trap spout 82, and operably connected to the control unit 55 so as to actuate the latter whenever the water temperature in the lower level of the compartment drops to below a predetermined temperature. Hence, whenever the temperature in the lower level of the compartment 24 becomes critically low (although the sensor 56 may be satisfied due to flow of hot water through the downspout 82) the control unit 55 will call for power to the heater 50; thus maintaining an adequate volume of heated water in the compartment to accommodate any expectable demand.

It will of course be appreciated that whereas in the drawing herewith the invention has been illustrated only as being embodied in single tank two-compartment water storage and supply systems, the invention may with equal facility be embodied in a system wherein the functionally separate storage and supply compartments are provided by means of separate tanks, if preferred; and that although only a few forms of the invention have been illustrated and described in detail by way of example hereinabove, various changes may be made therein without departing from the spirit of the invention or the scope of the following claims.

What I claim as my invention is:

1. An improvement in a system for providing hot water for delivery to service outlets including a unitary tank having water storage and delivery compartments therein, means for fluidly connecting said storage compartment to a source of unheated water, means for fluidly connecting said delivery compartment to said service outlets, said storage compartment delivering water into said delivery compartment in response to delivery of water from said delivery compartment to said service outlets, electrically powered means in said compartments for heating water therein, thermostat means actuated in response to water temperature in said compartments to control operation of said electrically powered means, said thermostat means being adjusted so that water in said storage compartment is maintained at a higher temperature than water in said delivery compartment, and a total-demand-monitored load system discriminating device serving to over-control said electrically powered means such that said electrically powered means of said delivery compartment is assigned a higher priority rating than the electrically powered means of said storage compartment, said improvement comprising in combination:
   a non-pressurized partition disposed transversely of and casually fitting within said tank, said partition serving to functionally divide said tank into said compartments,
   means to interconnect said compartments across said partition in free flow communication such that said partition is not subject to appreciable differences in water pressure loadings thereacross, and
   a water transfer trap device arranged to deliver water from said storage compartment into said delivery compartment in response to the delivery of water therefrom to said service outlets, said trap device interconnecting an upper level portion of said storage compartment with a relatively lower level portion of said delivery compartment.

2. An improvement according to claim 1, wherein said interconnecting means comprises at least one aperture in said partition, such partition aperture interconnecting relatively lower levels of said compartments.

3. An improvement according to claim 1, wherein said water transfer trap device is arranged to deliver water from said storage compartment into the region of said thermostat means responsive to temperature in said delivery compartment.

4. A water-heating-storing and supply system as set forth in claim 3 wherein a temperature sensor is disposed in said delivery compartment at an elevation below said thermostat means responsive to temperature in said delivery compartment and more remote from the delivery of heated water through said trap device, said sensor being operably connected in parallel to said thermostat means in said delivery compartment.

5. An improvement according to claim 1, wherein said trap device includes a downspout extending downwardly within said delivery compartment and arranged in free-flow communication with an aperture through said partition in the region of an upper level portion of said storage compartment.

6. An improvement according to claim 5 wherein said tank is horizontally elongate and said compartments are relatively disposed in horizontally-tandem arrangement and said interconnecting means comprises at least one aperture in said partition, said partition aperture interconnecting relatively lower level portions of said compartments.

7. A water-heating-storing and supply system as set forth in claim 5 wherein said tank is vertically elongate and said storage and delivery compartments are relatively disposed in vertically-tandem arrangement.

8. A water-heating-storing and supply system as set forth in claim 5 wherein said tank is vertically elongate and said storage and delivery compartments are relatively disposed in horizontally-tandem arrangement.

References Cited

UNITED STATES PATENTS

| | | | |
|---|---|---|---|
| 2,386,949 | 10/1945 | Hayward | 219—314 |
| 2,779,855 | 1/1957 | Sawyer | 219—321 X |
| 2,834,865 | 5/1958 | Coates | 219—321 X |
| 3,383,495 | 5/1968 | Laube et al. | 219—321 |

ANTHONY BARTIS, Primary Examiner

U.S. Cl. X.R.

219—321, 330, 485